Dec. 31, 1929.  L. B. GRAFANI ET AL  1,741,622
STERILIZER FOR TOILET SEATS AND THE LIKE
Filed Jan. 23, 1928  7 Sheets-Sheet 1

Inventors
LEON B. GRAFANI
AND ROBERT E. PETERSON
by Hazard and Miller
Attorneys.

Dec. 31, 1929.  L. B. GRAFANI ET AL  1,741,622
STERILIZER FOR TOILET SEATS AND THE LIKE
Filed Jan. 23, 1928   7 Sheets-Sheet 2

Inventors
LEON B. GRAFANI
AND ROBERT E. PETERSON
by Hazard and Miller
Attorneys.

Dec. 31, 1929.  L. B. GRAFANI ET AL  1,741,622
STERILIZER FOR TOILET SEATS AND THE LIKE
Filed Jan. 23, 1928   7 Sheets-Sheet 3

Inventors
LEON B. GRAFANI
AND ROBERT E. PETERSON
by Hazard and Miller
Attorneys.

Dec. 31, 1929.  L. B. GRAFANI ET AL  1,741,622
STERILIZER FOR TOILET SEATS AND THE LIKE
Filed Jan. 23, 1928  7 Sheets-Sheet 4

Inventors
LEON B. GRAFANI
AND ROBERT E. PETERSON
by Hazard and Miller
Attorneys.

Dec. 31, 1929.                L. B. GRAFANI ET AL              1,741,622
                    STERILIZER FOR TOILET SEATS AND THE LIKE
                    Filed Jan. 23, 1928         7 Sheets-Sheet 5

Dec. 31, 1929. L. B. GRAFANI ET AL 1,741,622
STERILIZER FOR TOILET SEATS AND THE LIKE
Filed Jan. 23, 1928 7 Sheets-Sheet 7

Patented Dec. 31, 1929

1,741,622

UNITED STATES PATENT OFFICE

LEON B. GRAFANI AND ROBERT E. PETERSON, OF LOS ANGELES, CALIFORNIA, ASSIGNORS, BY MESNE ASSIGNMENTS, TO AMERICAN AUTOMATIC SANITATION COMPANY, OF WILMINGTON, DELAWARE, A CORPORATION OF DELAWARE

STERILIZER FOR TOILET SEATS AND THE LIKE

Application filed January 23, 1928. Serial No. 248,724.

Our invention is a sterilizer for toilet seats and the like and in the method of sterilizing.

An object of our invention is the construction of an apparatus, and a method of sterilizing toilet seats by temporarily enclosing the seat in a sterilizing receptacle, and thus sterilizing the seat.

A more particular object of our invention is to mount a sterilizing receptacle, with doors to open and close, in a fixed relation to a toilet bowl so that the seat may be folded upwardly, pass between the doors when open, and be enclosed in such receptacle by the doors, the seat being then sterilized.

Another object of our invention is to sterilize a seat by a sterilizing fluid and then dry, and if desired, cool the seat by an air blast; and in this connection a more particular object of our invention is sterilizing the seat by steam at a relatively hot temperature, and after a proper time interval of sterilizing, to dry and cool the seat by a blast of air.

A more particular object of our invention is to enclose the seat in a sterilizing chamber and then sterilizing it with the steam under a sufficiently high temperature to be dry or if desired, injecting a hot fluid on the seat to sterilize same; then after a predetermined period of sterilization, the seat is dried and cooled by an air blast which preferably blows the condensed steam and moisture and the blast of air into the bowl. It will thus be seen that our invention comprehends not only sterilizing by means of a gas, such as steam, but a hot fluid may be used such as water; and it is to be understood that in this steam and water, if desired, there may be sterilizing chemicals.

Another object of our invention is a mechanism by which the seat is hinged upwardly from the bowl and passes through doors connected to the sterilizing receptacle. These doors automatically close and become locked. The sterilizing fluid is then automatically turned on and left in operation for a predetermined time interval; then in succession the steam is turned off and the air turned on. The seat is then left in the receptacle until dried.

Another object of our invention is to have the whole mechanism connected with the sterilizing of the seat governed by a coin control device, whereby the insertion of a proper coin and manipulating of a device such as a lock on the door starts the mechanism in operation, the doors being opened and the seat lowered, the doors then closing; the remaining part of the cycle is started by a slight upward movement of the seat, it being again enclosed in the sterilizing chamber and sterilized. Various other details of our objects and improvements will appear from the detailed description.

Our invention also pertains to the method of sterilizing toilet seats in which, broadly stated, the seat is brought into contact with the sterilizing medium such as steam or hot water, with or without chemicals of a disinfecting nature, and then the seat is suitably dried and cooled. More specifically, our method may be defined as shifting the seat out of and then back into a sterilizing receptacle, injecting steam or hot water on the seat and leaving this for a predetermined time, then injecting a blast of air through the sterilizing chamber and on the seat, thereby effectively drying and cooling the seat.

In constructing our mechanism, it may be stated in brief that we preferably mount a suitable framing device or receptacle with a sterilizing chamber therein supported partly on the back portion of the toilet bowl and on the wall, this receptacle having a pair of hinged doors. An electric motor has an air fan connected thereto and is adapted to be controlled by a coin control device which, on insertion of a coin, and through a train of gears then operates a series of cams, one cam through the medium of door opening and closing racks and gears opens the doors; another cam through the medium of a seat operating rack and gears lowers the seat; by cam action in conjunction with springs the doors are then closed. On a slight depression of the seat the mechanism is rendered inoperative, and on the returning motion of the seat the electrical device is again operated, then again by means of the cams opening the doors and raising the seat into the receptacle and again closing the doors. Through the medium of a cam action, the doors are positively locked closed.

The next action involves the control of a water valve by a cam allowing flow of water to a pump operated by a motor. This pump forces water through an electric heater where it is heated to a high temperature and injected in the sterilizing chamber on the seat, either in the form of hot water or steam; and in this action the outlet from the sterilizing chamber is closed, these actions being controlled by cams driven by the motor. The next action, also controlled by cams driven by the motor, is to stop the action of the sterilizing and admit a blast of air into the sterilizing chamber, at the same time opening an outlet to blow the air and entrained moisture into the toilet bowl. This leaves the device in condition to repeat the cycle on using another coin and actuating the initiating mechanism.

Our invention in its various aspects will be more readily understood from the following description and drawings, in which.

Figures 1, 22, 23:
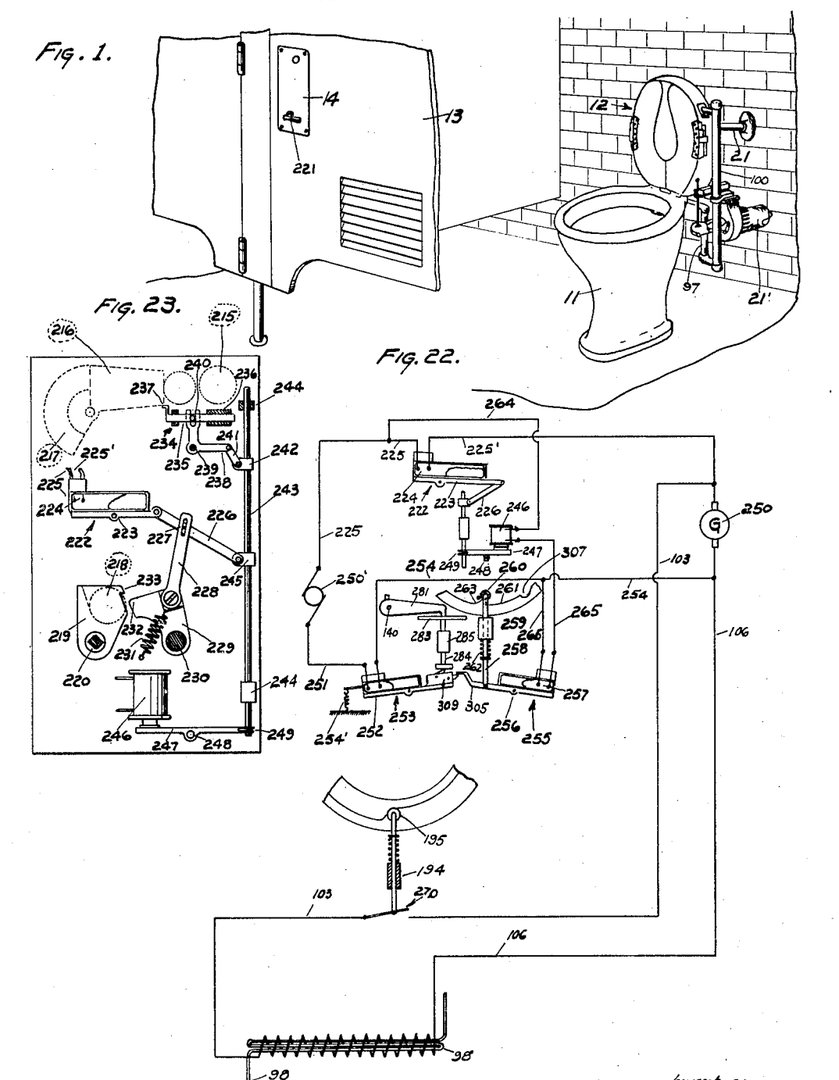
Figure 1 is a perspective view partly broken away of an installation of our equipment, and showing the coin control device mounted on a door.
Fig. 22 is a wiring diagram showing sections of some of the cams and certain of the electric switches.
Fig. 23 is a detail vertical section partly in elevation of a suitable coin controlling mechanism.

The general arrangement of our invention is indicated particularly in Fig. 1, in which a toilet bowl is indicated by the numeral 11, and positioned behind this bowl there is the container 12 which forms a housing for the sterilizing chamber and the various mechanisms connected with the opening and closing of the doors, the movement of the seat, the injection of steam and air, etc. A door is indicated by the numeral 13 and on this door there is a coin control device 14. The coin control device in controlling an electric circuit causes the operation of the device.

The various features of the casing are substantially as follows: A pair of bracket studs 15 are rigidly secured to the bowl 11 and carry a bottom plate 16, which forms the bottom part of the casing or housing 17, this casing having side walls 18, a top wall 19 and a rear preferably flat wall 20. This casing is braced to the wall of the building by a tubular bar 21 which carries the water pipes as well as the electric wiring (note Figs. 1, 2 and 7).

Figures 2, 13, 14:
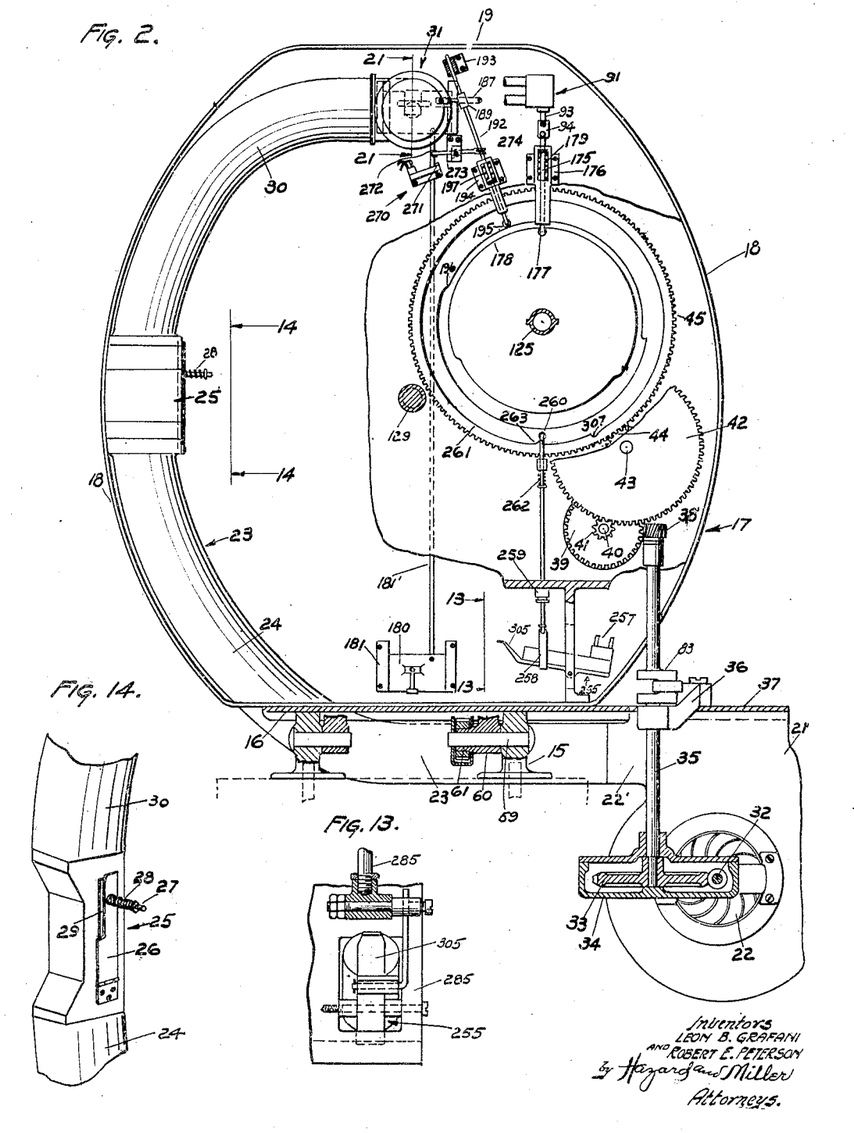
Fig. 2 is a vertical section taken substantially on the irregular line 2—2 of Fig. 7 in the direction of the arrows, through the mechanism receptacle, showing the rear or innermost parts of the control mechanism and illustrating in particular the train of gears operating from the electric motor to the cams, the control for the water valve, the air valve and the air duct.
Fig. 13 is a detail elevation partly in section on the line 13—13 of Fig. 2 in the direction of the arrows, showing in particular one of the electric control switches.
Fig. 14 is a detail elevation on the line 14—14 of Fig. 2 in the direction of the arrows, showing the air relief or safety valve.

The electric motor housing 21' having a fan 22 therein is suspended from the bottom plate 16. The fan has a connection 22' to an air duct 23 which, at the bottom, is positioned below the bottom plate 16 and then rises through this plate, and having a curved section 24 fitting against the left hand side 18 of the casing when looking towards such casing. This duct has a relief valve 25 therein which is shown as having a hinged leaf 26. A stem 27, secured to a fixed structure, and a spring 28 interengage between the stem and the hinged leaf. There is a gasket 29 adjacent the leaf. There is a curved section 30 in the upper part of the container which terminates in the air valve 31 (note Fig. 2). This air valve is controlled and operated as hereunder set forth and is designed to blow out the steam after sterilizing and cooling the seat, the air relief valve being designed to release the air should the pressure become to great (Figs. 2 and 14.)

The main drive is from the shaft 32 of the motor, this being preferably horizontal and connected by worm drive to a worm wheel 33. This gear is housed in a gear casing 34, and extending upwardly there is a transmission power shaft 35 which is supported in the bracket journal 36 secured to the extension 37 of the bottom plate 16. This shaft enters a gear and cam case 38, the back plate of which, 39, is illustrated in Fig. 2 and the casing section in Figs. 7 and 15.

The upper end of the shaft 35 has a worm or other suitable gear 38' which meshes with the gear 39' mounted on a shaft 40 in the gear box. On this shaft there is also a pinion 41 which meshes with the large gear 42 on the shaft 43, which, in turn has a pinion 44 which drives the main cam wheel 45.

Other main features of the invention comprise a sterilizing receptacle 46 which is suitably mounted adjacent the front of the casing 17. This receptacle has a rear wall 47, an outer wall 48 and an inner wall 49, and is open at the front 50; this receptacle forming the sterilizing chamber is somewhat horse-shoe shaped, being shaped to correspond with that of the seat. The outer wall is provided with a series of lugs 51, giving the proper spacing from the outer wall 18 of the main casing. There is a bridging piece 52 between the spaced ends of the sterilizing receptacle. (Note Figs. 5, 7 and 15.)

Figures 5, 7, 8, 9:
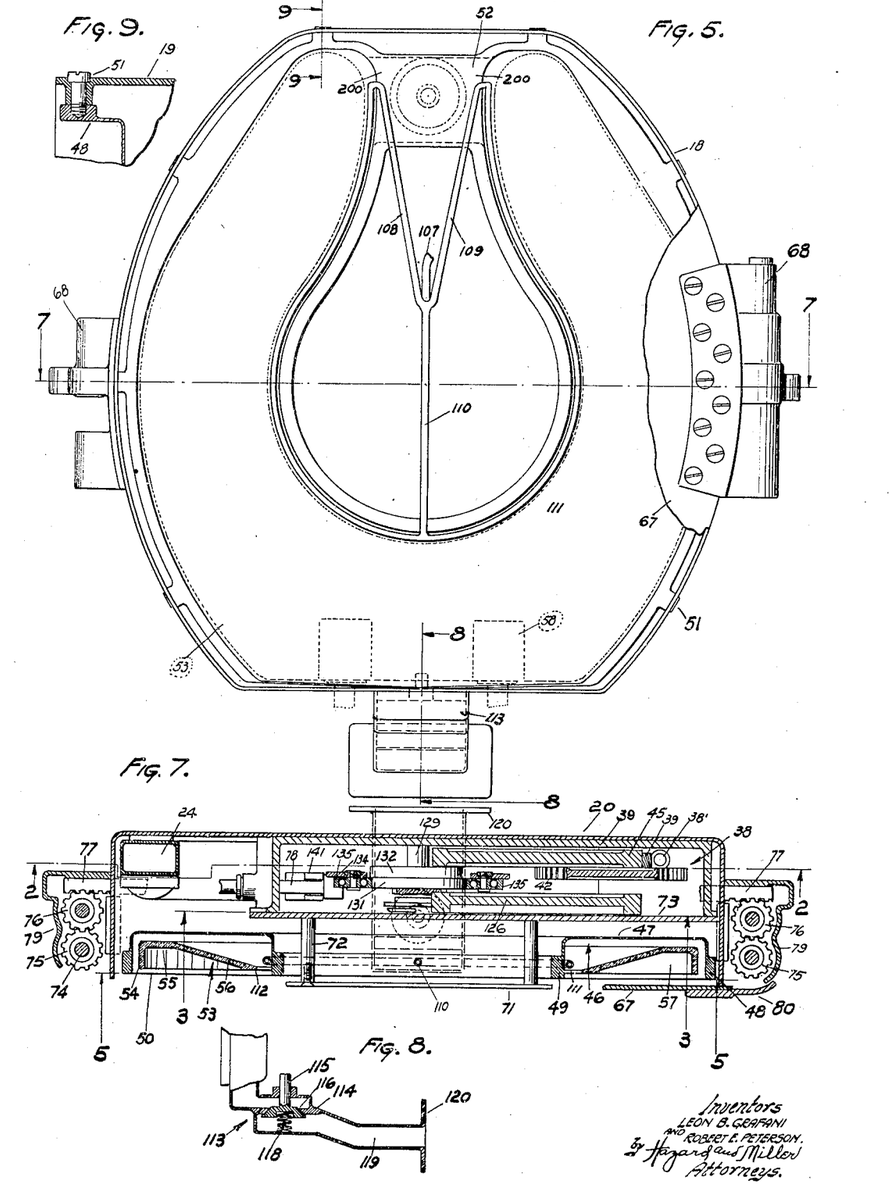
Fig. 5 is a vertical section on substantially the line 5—5 of Fig. 7, showing the seat folded into the sterilizing receptacle and illustrating part of a door.
Fig. 7 is a horizontal section illustrating parts substantially on the line 7—7 of Fig. 5 in the direction of the arrows.
Fig. 8 is a detail vertical section on the line 8—8 of Fig. 5 in the direction of the arrows showing the air exhaust valve.
Fig. 9 is a vertical detail on the line 9—9 of Fig. 5 in the direction of the arrows showing a manner of mounting and supporting the sterilizing chamber in the mechanism container.
Figure 11:
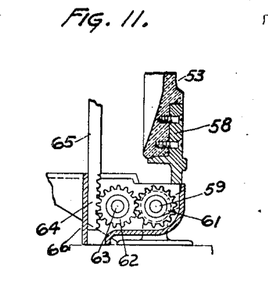
Fig. 11 is a detail vertical section on the line 11—11 of Fig. 3 in the direction of the arrows, showing the rack and gear connection for raising and lowering the seat.
Figure 12:
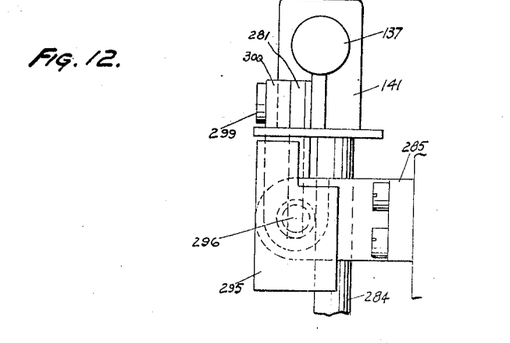
Fig. 12 is a detail vertical section on the line 12—12 of Fig. 4 in the direction of the arrows.
Figures 15, 16:
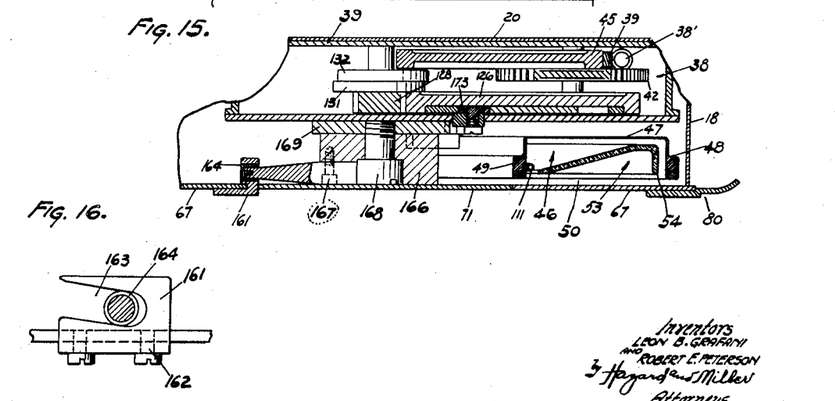
Fig. 15 is a detail section on the irregular line 15—15 of Fig. 6 in the direction of the arrows, showing part of the mechanism in the casing, part of the sterilizing chamber and one of the door locking bolts.
Fig. 16 is a detail section on the line 16—16 of Fig. 6 in the direction of the arrows, showing the action of the door locking bolt and a latch of the door.
Figure 17:
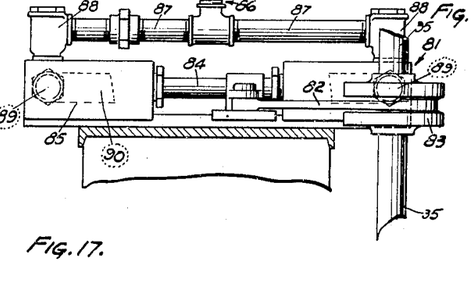
Fig. 17 is a detail longitudinal section through the water valve.
Figure 18:
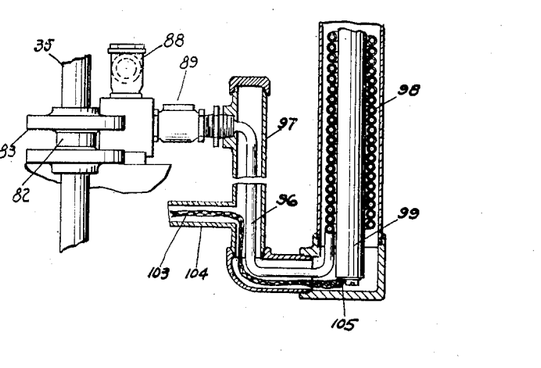
Fig. 18 is a detail side elevation of the water pump and its connections.
Figure 19:
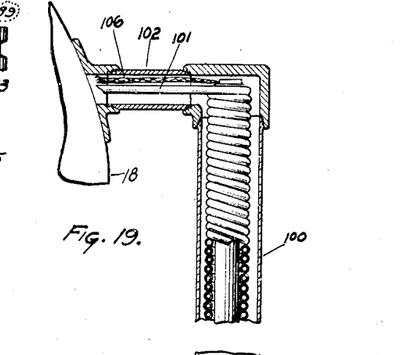
Fig. 19 is a detail section partly in elevation of the water heater or steam generator and its connections.

The seat 53 is formed with an outer rim 54, a horizontal surface 55 and a downwardly inclined surface 56, leaving preferably a hollow space 57 (Figs. 5, 7 and 15). This is preferably made of bakelite or similar material. At the back of the seat there is a hinge flange 58 mounted on the hinge pintles 59, these flanges terminating in hubs 60. One of these hubs has a lateral extension forming a pinion 61; this meshes with an idler pinion 62 mounted on a stud shaft 63 secured in a fixed part of the frame below the bottom plate 16, the idler meshing with a rack gear 64 mounted on a door controlling rack bar 65. This rack is held in position by a back plate 66 (note Figs. 2, 3 and 11).

In front of the seat, when housed in the sterilizing chamber and when folded downwardly, there are a pair of doors 67 mounted on side hinges 68 secured to the side walls 18 of the casing 17. The doors are in two parts and have a vertical meeting edge 69, and each door has a curved edge 70 at the junction of the fixed plate 71 which is secured in the space between the flanges 49 of of the sterilizing receptacle or chamber 46; this latter plate is held in position by posts 72 mounted on the front plate 73 of the gear and cam case 38.

Rigidly connected to the pintle 74 on which the doors are fixedly secured, there is a pinion 75 which meshes with an idler gear 76; this idler gear in turn meshes with a rack 77 on door operating rack bars 78. There is a flanged housing 79 extending laterally from the casing wall 18 enclosing these gears, the front portion being enclosed by an extension 80 of the doors 67.

The sterilizing system comprises a water pump designated generally by the numeral 81 which is driven by a pitman 82 connected to the crank 83 on the main shaft 35, the pitman being connected to the piston rod 84 which operates the pistons in the cylinders 85. The water is fed into the cylinders through an inlet pipe 86 having lateral branches 87 and check valves 88, and is discharged through outlets 89 which lead into a common pipe 90.

The control of the infeed of the water is by a water valve 91 positioned in the casing, this valve having an inlet pipe 92 drawing from a suitable source of supply and entering the container through the pipe 21. This valve has a valve stem 93 with a coupling 94 thereon and a valve plug 95, the outlet being through the pipe 86 which, being made of thin tubing, is bent to follow an unobstructed path through the casing, avoiding other parts enclosed therein and leading to the branch pipes 87 to the pumps which are located outside of the housing. The valve is controlled by a cam action as hereunto set forth.

The water after flowing from the discharge pipe 90 passes through a small bore tube 96 which is housed in a tubular casing 97. The tube leads to a vertical coiled stack 98 which is wound around an electric heating unit 99 contained in a tubular casing 100. The steam generated in the stack is lead by a tube 101 through a branch casing 102, this latter being connected to the side wall of the main casing 17. (Note Figs. 1, 17, 18 and 19.) One of the electric leads 103 leads through a conduit 104 connected to the main casing and to the tubular casing 97; this lead connects to the bottom 105 of the heating unit. The lead 106 from the top of the heating unit connects to the main casing through the horizontal tubular casing 102, and as above mentioned, these lead wires pass through the tubular bracing connection 21 between the back of the casing and the wall.

The steam generated is led by a steam tube 107, this being a continuation of the tube 101 and thence carried by the branches 108, 109 and 110 to the perforated discharge pipe 111 which follows the inside of the flange 49 of the sterilizing receptacle or chamber, and is adjacent the inner rim 112 of the seat when this is folded into the sterilizing chamber.

There is an outlet steam and air exhaust valve 113 which operates on a valve seat 114 in the bottom of the sterilizing chamber, the valve having a valve stem 115 with a valve plug 116 normally pressed upwardly by the spring 118. The stem is controlled in the manner hereunder set forth and the steam and air exhaust is carried by the conduit 119 having a flange 120, this latter being secured to the toilet bowl and discharging therein. (Note Fig. 8.)

Figure 3:
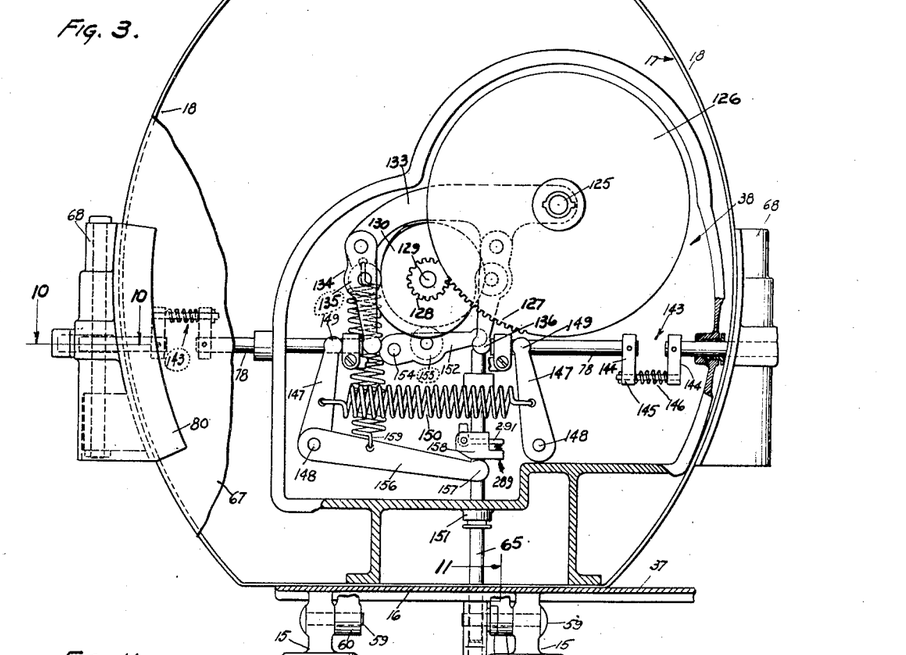
Fig. 3 is a vertical section on the line 3—3 of Fig. 7 illustrating part of the mechanism in the gear and cam case.

The main cam action is derived substantially as follows: As above mentioned, the power is transmitted through the power shaft 35 and a train of gears to the large cam wheel 45 at the back of the casing (Figs. 2 and 7). This wheel is mounted on a shaft 125, such shaft being journaled in the front and the back of the gear and cam case 38. A front intermittent gear 126 is mounted on this shaft, being keyed thereto to rotate therewith (Figs. 3 and 7). Such intermittent gear has teeth 127 which mesh with the mutilated gear 128 on the shaft 129, which shaft carriers exterior cams 130. These cams have a front and rear track 131 and 132 (Figs. 7 and 15).

Figure 4:
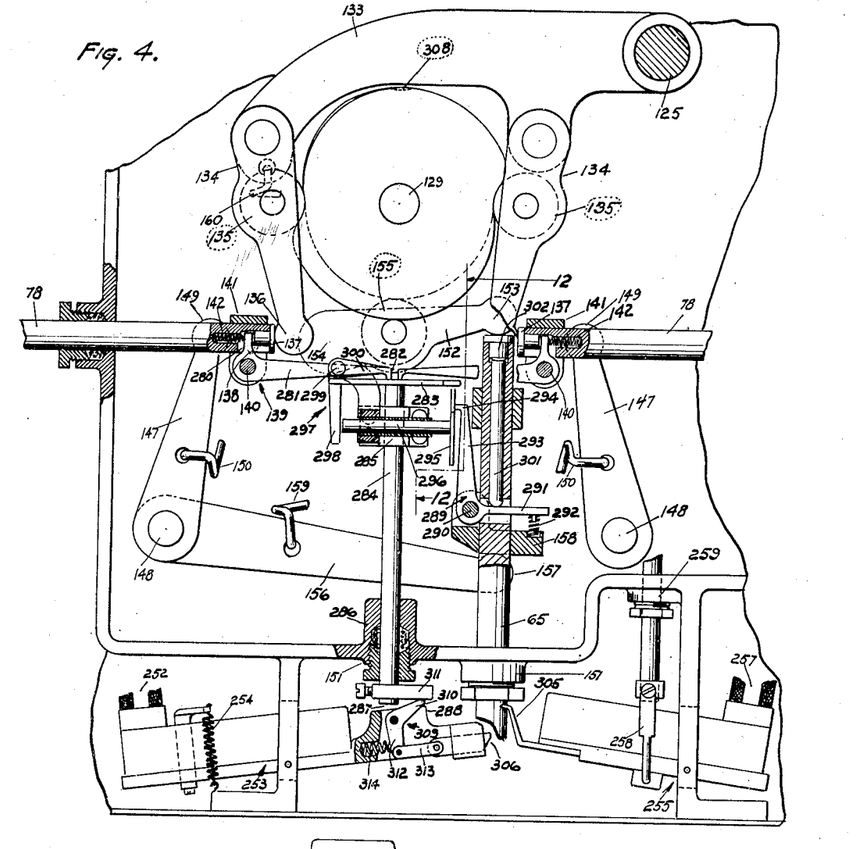
Fig. 4 is an enlarged view with parts broken away of some of the details shown in Fig. 3 and other elements associated therewith, certain of these elements being omitted in Fig. 3 for purposes of clarity of illustration.

The forward cam 131 is utilized to operate the door opening and closing mechanism as follows: An arm 133 is pivotally mounted on the shaft 125 (Figs. 3 and 4) and carries a pair of pivotally mounted depending fingers 134, each of these fingers having a roller 135 engaging the cam. The ends of these fingers have knobs 136 which operate the rack-operating bars 78. The detail mechanism has a plug 137 mounted in the ends of each of these operating rods, and such plug engaging the short ends 138 of a bell crank 139 mounted on a pivot 140 on a yoke 141 attached to each of the rack bars. There is a compression spring 142 mounted in the socket in each of these rack bars, the spring engaging the short arm 138 of the bell crank. These bell cranks are for a purpose hereunder set forth. The rack bars have a spring action by having a break 143 therein, with lateral arms 144 connected by a pin 145 secured to one of the arms and having a sliding relation to the other and with a spring 146 connected to the arms 144 on such pin (Fig. 3). By this arrangement, should a person attempt to close the doors manually, the springs 146 are compressed. In order to close the doors, arms 147 mounted on pivots 148 have knobs 149 pressing on the yokes 141 and drawn together by a tension spring 150 (Figs. 3 and 4). By this action the rollers follow the shape of the cam and cause the opening and closing of the doors.

The mechanism for raising and lowering the seat operated by the controlling rack bar 65 (Figs. 3 and 11) is substantially as follows: This bar passes through a gland 151 in the lower wall of the gear and cam case and the upper end is acted on by a lever 152 having a knob 153, such lever being mounted on a pintle 154. The lever has a roller 155 mounted therein, which engages the track of the inner cam 132. (Figs. 3 and 4.) In order to give a constant bearing of the roller against the cam, an arm 156 having a knob 157 engages a yoke 158 clamped on the rack 65. This arm 156 is pivoted on one of the pintles 148 and has a tension spring 159 caught between such rod and the outer end 160 of the arm 133. The action of the intermittent gear 126, having the teeth 127 acting on the mutilated gear 128, it will thus be seen gives the action of the opening and closing of the doors and the lowering and raising of the seat with the intermittent rest period therebetween while such gear is completing its rotation.

Figure 6:
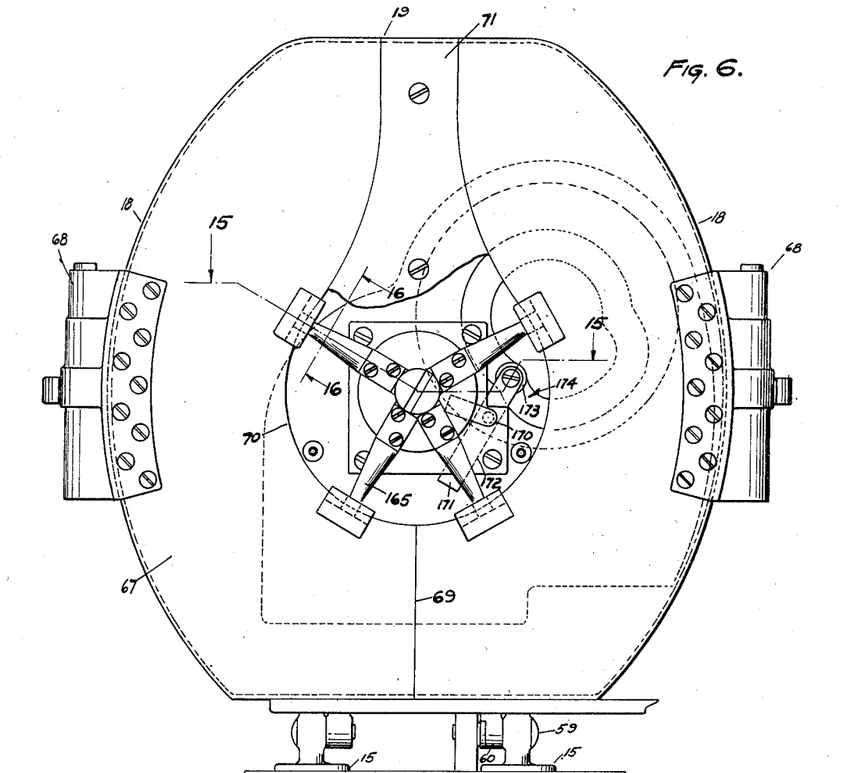
Fig. 6 is a front elevation showing the doors closed and with a fixed center plate broken away to show the door locking bolts.
Figure 10:
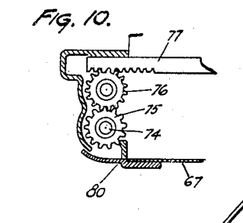
Fig. 10 is a horizontal detail section on the line 10—10 of Fig. 3 in the direction of the arrows showing the door operating rack and gearing.

The door locking mechanism is substantially as follows, having reference particularly to Figs. 6, 15 and 16: Each of the doors 67 is provided with a latch 161 secured by screws 162 or the like thereto, and on the inside of each latch there is a slot 163 which slots are engaged by sleeves 164 on the latch bolts 165 which are mounted in an oscillatable block 166, being secured by screws 167. This block is mounted on a stud 168 which is secured to a back plate 169.

Connected to the oscillating block 166 there is a lug 170 which has an engagement at its outer end with a sliding rod 171, this rod operating in guideways 172 in the back plate 169. Such rod has a roller 173 which engages in the cam groove 174 built into the intermittent gear 126. Therefore, on rotation of such gear, the latching bolt arms are given a partial rotary motion which, engaging in the slots 163, draw the doors firmly closed and hold them in such closed position, and in another part of the movement, unlatching the doors and permit opening and closing.

The cam control for the various valves is substantially as follows: The water valve 91, as above mentioned, has a stem 93 with a coupling 94 thereon which coupling is connected to a stem 175 (Fig. 2), which stem slides through a bracket 176 secured to the back of the casing; and such stem having a roller 177 engaging an internal cam 178 on the main cam gear 45. A spring 179 reacts against the stem constantly holding the roller against the cam. Therefore, on rotation of such cam, the water valve is held open for a predetermined length of time at the proper sequence in the operation and is then closed. As long as the water valve is open, as above mentioned, the steam is generated and forced into the sterilizing chamber.

Figure 20:
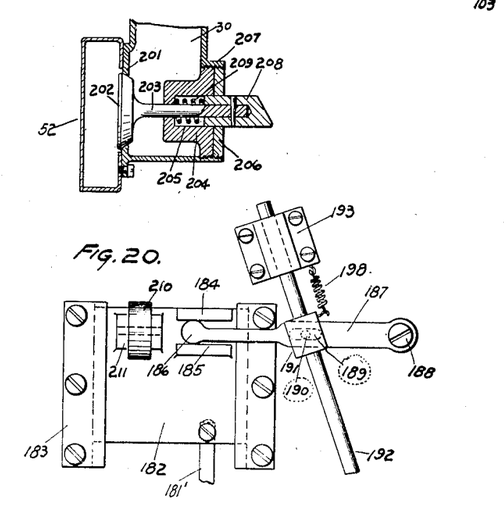
Fig. 20 is a detail elevation showing the slide plate and its control for opening the air valve into the sterilizing chamber.

In order to clear the steam from the sterilizing chamber and cool the seat, air is blown through this chamber, as above mentioned, the steam and air exhaust being by the valve 113, detailed in Fig. 8, which valve has a valve stem 115. This stem connects to a slide plate 180 mounted in guides 181 secured to the casing (Fig. 2). A linking rod 181' is connected to the plate 180 and extends upwardly through the casing, connecting to an upper slide plate 182 mounted in guides 183 (Figs. 2 and 20). This guide plate has a pair of shoulders 184 forming a groove 185 therebetween, in which is engaged the head 186 of a rock lever 187 mounted on a pivot 188. This rock lever has a slot 189 engaging a pin 190 mounted on a collar 191 on a cam operating stem 192.

This stem 192 (Figs. 2 and 20) is slidable in a guide bracket 193 at the top and a second bracket 194 adjacent the bottom and has a roller 195 which contacts with the external cam 196, there being a spring 197 tensioned to hold the roller in close contact with the cam. A light spring 198 is engaged between the bracket 193 and the collar 191 and functions to support the weight of the slide plates 182 and the associated parts.

Figure 21:
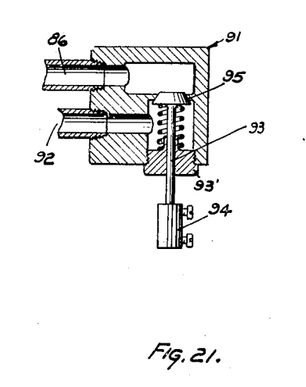
Fig. 21 is a detail vertical section on the line 21—21 of Fig. 2 in the direction of the arrows.

The air inlet valve for blowing air into the sterilizing chamber is illustrated particularly in Fig. 21. As above mentioned, there is a bridging piece 52 between the spaced ends of the sterilizing receptacle, this bridging piece being open at the ends 200. The upper section 30 of the air duct 23 (Fig. 2) is connected to the under side of the structure formed by this bridging piece 52, and has a valve seat 201, in which is mounted a valve plug 202 having a stem 203. This stem extends through a plug 204 having a socket 205 therein, the plug being held in place by a nut 206. The plug and the nut are screw-threaded into the portion 207 of the air duct 23. Connected to the stem there is a cam end 208 which is outwardly pressed by a spring 209 in the socket 205. This cam end engages a roller 210 mounted in ears 211 on the face of the slide plate 182.

It will therefore be seen that when the roller 195 is acted upon by the external cam 196 (Fig. 2) that this actuates the guide plates 180 and 182 through the medium of the stem 192, and opens the air valve so that air which is forced by the fan through the duct 23 is blown out under the bridging piece 52 and laterally in both directions into the sterilizing chamber. At the same time the steam and air exhaust valve 113 (Fig. 8) is open, allowing the steam and exhaust air to be blown into the bowl. This action not only clears out the waste steam, but functions to cool the seat.

The electrical controls are substantially as follows: First the door 13 of the cabinet is controlled by a coin control device 14, this being illustrated generally in Figs. 1 and 23, with the electric detail in the wiring diagram of Fig. 22. The coins are insertable through a coin opening 215 and pass into a balancing device 216 which is arranged to discharge light coins or slugs at the discharge end 217. The legitimate coins are passed through a suitable chute, not illustrated, into a coin-receiving pocket 218 in a latch 219. The particular coin and slug separator, chute, etc., are not illustrated in full as various types may be utilized, and such features are no part of our invention.

This latch 219 is rigidly connected to the spindle 220 having the operating handle 221. This spindle may be also connected to the bolt of the door to bolt and unbolt such door. A mercury switch 222 is mounted on a balance plate 223 and has contacts 224 therein which lead to the main leads 225 and 225' of the main motor. The balance plate is pivotally connected to a link 226, and this link has a pin and slot connection 227 with a secondary link 228, which link is pivotally mounted on a dog 229 mounted on a pivot 230 and retracted by a spring 231. Such dog has a tooth 232 which is engaged by the shoulder 233 on the latch 219 if there is no coin in the pocket 218, and the operation of the handle 221 is prevented, the mercury flowing to the low end of the switch 222 and opening the circuit at the contacts 224.

However, if there is a coin in the pocket 218, this causes the dog 232 to clear the shoulder 233, being rocked in a clockwise direction having reference to Fig. 23, which action raises the secondary link 228 and elevates the link 226, thereby tilting the mercury switch so that a circuit is established at the contacts 224.

When the device is operative a coin stop, designated generally by the numeral 234, comes into operation. This coin stop involves a slidable rod 235 mounted in guides 236 and having a tip end 237 adapted to prevent entrance of coins into the coin balance 216 when thrust to the left, having reference to Fig. 23, which movement is communicated by a bell crank 238 mounted on a pivot 239 and having a pin and slot connection 240 with the stem 235. Such bell crank is actuated by a link 241 connected to a collar 242 on a vertically slidable rod 243 mounted in guides 244, such rod being connected to a second collar 245 pivotally connected to the link 226. Therefore, when the switch 222 is tilted to establish the circuit, the coin stop 234 is shoved to the left (Fig. 23) preventing entrance of the coin.

There is also an electro-magnetic device such as a solenoid 246 which has a pivoted armature 247 mounted on a pivot 248, the opposite end of this having a pin and slot connection 249 with the lower end of the rod 243. The switch 222, the solenoid 246 and the interconnection of such elements, is illustrated in the diagrammatic drawing of Fig. 22.

In Fig. 22 a generator is indicated at 250 and the switch 222 is illustrated in the open position. However, in the closed position the circuit passes from the generator to the lead 225' through the contacts 224, the lead 225 to the motor 250', thence by the lead 251 to the contacts 252 of the mercury switch designated generally by the numeral 253, described in detail hereunder; thence by the lead 254 back to the generator.

When the latch 219 is turned, oscillating the switch 222 to the closed circuit position, this latch device on release leaves the switch in such closed position and the coin stop 237 in its operative position; also the armature 247 is drawn away from the solenoid 246. The switch 253 is normally held in a closed circuit position by means of a spring 254'.

A mercury switch 255 is mounted on a pivot 256 and has contacts 257. The switch is actuated by a cam rod 258 pivotally connected thereto, such cam rod operating through a guide 259 and having a roller 260 which runs on an internal cam track 261 (Figs. 2 and 22). A spring 262 normally holds the roller against such track. The roller is illustrated in Figs. 2 and 22 as riding on the top of the single lift 263 of this cam track and such action oscillates the switch 255 from its open circuit to its closed circuit position. Such switch normally, when the roller rides on the run of the cam, is on its open circuit position.

When this switch 255 is thus brought into the closed circuit position (Fig. 2 and 22) there is a circuit established including the generator 250, the leads 255, the contacts 224 of the switch 222, part of the lead 225, the lead 264 to the solenoid 246, thence the lead 265 to the contacts 257 of the switch 255, thence by the lead 266 and part of the lead 254 to the generator. This action in energizing the solenoid draws upwardly on the armature 247, hence giving a downward movement to the rod 243, which action transmits an oscillating movement to the switch 222, shifting this from the closed circuit to the open circuit position shown in Figs. 22 and 23, which action manifestly brings the motor to a stop.

The circuit for the electric water heater to generate the steam is operated as follows: This involves a switch block 270 (Fig. 2) having a fixed contact 271 with which operates the contacts on the switch arm 272, shown as pivotally mounted on a plate 273.

This switch arm has a pin and yoke connection 274 with the stem 192 controlling the air valve for the air blast to clear the sterilizing chamber and the exhaust valve to exhaust such waste steam and air. The electric switch is closed when the inlet and exhaust air valves are closed, and during this time, therefore, the water is heated and steam injected into the sterilizing chamber, this switch for the heater being in open circuit position when the blast of air is passed through the sterilizing chamber.

A safety mechanism is provided to open the motor circuit if a person should endeavor to operate the doors or the seat, this being constructed substantially as follows, having reference particularly to Fig. 4: As above mentioned, there are a pair of bell cranks 139 pivoted at 140, which have their short arm operating in the slot 138 and pressed open by the springs 142. The long ends 281 of such arms have downwardly extending fingers 282 which bear on a plate 283, such plate being attached to a thrust rod 284 slidable in an upper guide 285 and lower guide 286 in the bottom of the gear and cam case, this latter having an oil-tight packing. Therefore, if the doors are manipulated manually so as to press the rack bar 78 outwardly, the springs 142 give a resilient action against the short arms 138 of the bell crank 139, causing the long arms to press downwardly on the plate 283, thus thrusting the rod 284 downwardly, the lower end 287 of such rod bearing against the lug 288 on the frame carrying the mercury switch 253, this breaking the circuit through this latter switch and stopping the motor.

The safety arrangement to stop the motor on manipulation of the seat is through the medium of a bell crank 289 mounted on a pivot 290 carried by the yoke 158 secured to the rack bar 65 (Figs. 3 and 4). The short arm 291 of this bell crank is actuated by a spring 292 and the long arm 293 has a finger 294 which engages a plate 295 carried by a cross rod 296 mounted in a suitable slide on the guide 285. This rod acts on another bell crank 297 engaging the arm 298 thereof and pivoting this bell crank on the pivot 299, whereby the finger on the other end 300 bears on the plate 283. There is a slide rod 301 mounted in a bore in the rack bar 65 and having a stud 302 on the top engaged by the knob 153 of the lever 152 which, as above mentioned, is cam controlled to operate the rack bar for controlling the movement of the seat. Therefore, it will be seen that when the bell crank 289 is rocked so that it presses inwardly on the plate 295, this transmits motion through the bell crank 297, thrusting downwardly on the rod 284 and hence tilting the mercury switch 253 to break the circuit to the motor.

When the device comes to rest at the end of a cycle, the switch 255 is lifted into the closed circuit position by the lift 263 of the cam 261. This action raises the finger 305 on the frame of the switch 255 above the trigger 306 slidably mounted on the outer end of the frame of the switch 253 (Figs. 4 and 22). This action, by energizing the electro-magnet 246, shifts the switch 222 into the open circuit position and thus stops the motor. The momentum of the moving parts, however, is sufficient to carry the roller 260 off the lift 263, the roller falling down onto the main portion of the cam 261 and opening the circuit through the switch 255.

It may be stated that the steam and air exhaust valve 113, shown in Fig. 8, acts in effect as a safety valve in regard to the steam used in the sterilizing chamber. This valve is normally kept closed by the spring 118, and if the pressure becomes excessive, the valve is opened.

The cycle of operation is substantially as follows: The arrangement, as above mentioned, comes to rest with the seat in the sterilizing chamber, the sterilizing being complete and the waste steam having been blown out by the air, and the switch 222 is in the open circuit position, the switch 253 in the closed circuit, and the switch 255 in the open circuit position. Then when a coin is inserted in the coin control device, this actuates the switch 222, shifting it to the closed circuit position, which operates the electric motor, transmitting motion to the various cams. As above mentioned, the cam 130, having the tracks 131 and 132, is actuated through the medium of the mutilated gear 128 on the shaft 129 engaging with the intermittent gear teeth 127 on the gear 126. The action of the front cam track is to open the doors and of the back cam track to lower the seat. These cams turn substantially half a revolution, the roller 155 causing the seat to be completely lowered onto the bowl, then the roller moves upwardly into the notch 308. During this part of the movement the roller 260 has shifted into the notch 307 on the cam 261 due to the rotation of this cam, which action causes a further downward tilting of the switch 255 so that the finger 305 engages the trigger 306 on the switch 253 and tilts this switch to the open circuit position. This causes the motor to come rest and remain at rest until the seat is manually operated.

This action leaves the seat at a slight inclination to the bowl. The seat is then manually pressed downwardly to the bowl when using, and this action causes a downward movement of the rack 65, which action, through the medium of the bell crank 289, the cross rod 296, the bell crank 297 and the rod 284, actuates a bell crank mechanism 309.

This bell crank is mounted in the lug 288 of the frame of the switch 253 and has its upper end 310 downwardly pressed by the collar 311 clamped on the lower end of the rod 284, which action draws back on the lower end 312 of the bell crank and, by means of the link 313, draws the trigger 306 inwardly. This bell crank is normally pressed outwardly by the spring 314. Such action allows the oscillating movement of the switch 253 from the open to the closed circuit position without the trigger 306 engaging the finger 305 of the switch 255; thus this latter switch is left in the open circuit position, the roller 260 travelling on the circular part of the cam 261.

The remaining portion of the cycle causes the raising of the seat and the closing of the doors by the action of the cam tracks 131 and 132 of the cam 130, and after such doors are closed, the water valve 91 is opened, due to the action of the roller 177 acting on the internal cam 178. The electric circuit through the electric heater is also closed by the action of the roller 195 acting on the external cam 196, this causing an injection of steam into the sterilizing chamber.

After the water is shut off and the electric heating circuit to generate the steam is opened, the air valve 31 is opened by the action of the roller 195 of the cam 196, this forcing an air blast through the sterilizing chamber, blowing the residual steam out of such chamber and cooling the seat. As a final step, the motor is brought to rest by the roller 260 being lifted on the rise 263 of the cam 261, again bringing the switch 255 into the closed circuit position, energizing the solenoid 264, shifting the switch 222 to the open circuit position and, due to the momentum, the roller passing off such rise onto the lower portion of the cam. This leaves the mechanism ready for insertion of another coin and repetition of the above cycle.

Various changes may be made in the principles of our invention without departing from the spirit thereof, as set forth in the description, drawings and claims.

We claim:

1. A sterilizer comprising in combination a toilet bowl, a seat therefor, a structure having a chamber to house said seat, and means to inject a sterilizing fluid into said chamber means to retain the fluid in the chamber a predetermined period, and means to withdraw said fluid from the chamber.

2. A sterilizer comprising in combination a toilet bowl having a seat, means to move the seat in relation to the bowl, a structure having a chamber, means to house said seat in said chamber in one position, and means to inject a sterilizing fluid into said chamber means to retain the fluid in the chamber a predetermined period, and means to withdraw such fluid after use.

3. A sterilizer comprising in combination a toilet bowl, a seat movable in relation thereto, a structure having a chamber to house said seat in an elevated position, a closure for said chamber allowing movement of the seat between the chamber and the bowl, and means to operate in sequence the raising of the seat into the chamber, the closing of the said closure, the injection of the sterilizing fluid in the chamber, the retention of the fluid in the chamber for a predetermined period, and the withdrawal of the used fluid.

4. A sterilizer comprising in combination a toilet bowl, a pivotally mounted seat therefor, a structure having a receptacle to house said seat in an elevated position, a door hinged to said receptacle, means mounted in said receptacle to actuate the seat to shift same from the bowl to the receptacle and to open and close the said door, the said receptacle when the door is closed having a sterilizing chamber, and means to inject a sterilizing fluid therein and to withdraw said sterilizing fluid.

5. A sterilizer comprising in combination a toilet bowl having a pivotally mounted seat, a structure having a receptacle mounted back of the bowl, the said seat in an upright position fitting in the receptacle, doors connected to said receptacle, a power mechanism, a structure forming a gear box with a series of gears and cams therein mounted in the receptacle, means to actuate said gears and cams with mechanism connected thereto to raise and lower the seat to close said doors when the seat is housed in the receptacle, said receptacle having a sterilizing chamber when the doors are closed, means to inject steam in the sterilizing chamber, means to retain the steam in the chamber a predetermined period, means to force a current of air through the sterilizing chamber, and means to exhaust the steam and air.

6. A sterilizer comprising in combination a toilet bowl, a seat therefor, a structure having a sterilizing chamber to house the seat in one position, means to inject steam in said chamber, and means to force air through the chamber to cool the seat and to exhaust the waste steam.

7. A sterilizer comprising in combination a toilet bowl, a pivoted seat therefor, a structure having a receptacle to house the seat in an elevated position, doors forming a closure for the receptacle, said doors when closed forming a sterilizing chamber housing the seat, a power mechanism and means operated thereby to operate in sequence the raising of the seat and the closing of the doors, means to inject steam into the sterilizing chamber and subsequently force air through said receptacle to cool the seat and exhaust the waste steam.

8. A sterilizer comprising in combination a toilet bowl, a pivotally mounted seat therefor, a structure forming a receptacle for a seat when in an elevated position, a rack and pinion to raise and lower the seat, a gear train operating a cam in the receptacle, a power drive for the gear train and a connection from the cam to the rack to actuate the said pinion for controlling the movement of the seat.

9. A sterilizer, as claimed in claim 8, doors pivotally connected to the receptacle, a rack and pinion mechanism to open and close the doors, and a cam operated by the gear train to actuate said rack and pinion.

10. A sterilizer comprising in combination a toilet bowl, a pivotally mounted seat therefor, a structure forming a receptacle to house the seat in an elevated position, an electric motor having an operating circuit with switches therein, a coin-actuated mechanism to control the said circuit to start the motor, a gear train actuated by the motor, and means operated by said train to raise and lower the seat, a closure for the receptacle, means operating said closure from the gear train, and means to stop said motor after a predetermined movement.

11. A sterilizer, as claimed in claim 10, means to start the motor on releasing of the seat from the bowl, and a power transmission mechanism operated by the motor, said mechanism controlling the injection of a sterilizing fluid and the exhaustion of such used fluid from the receptacle housing the seat.

12. A sterilizer comprising in combination a toilet bowl having a pivotally mounted seat, a structure forming a housing for the seat in an elevated position, an electric motor, doors forming closures for said receptacle, an electric water heater to generate steam, a circuit for said motor having switches, means to actuate a switch to close the motor circuit, a gear train having mechanism connected thereto to raise and lower the seat and to close and open said doors, the seat when housed in the receptacle and the doors closed being in the sterilizing chamber, means to energize the electric water heater to charge the receptacle with steam, and means to exhaust the waste steam.

13. A sterilizer, as claimed in claim 12, an air fan having an air duct to the sterilizing chamber, means operated by the motor through the said gear train to open said duct to the sterilizing chamber to force air therein and to open an outlet from said chamber for the waste steam and air.

14. In a sterilizer, a toilet bowl having a pivotally mounted seat, a structure back of the bowl forming a housing for the seat when in an elevated position, a plurality of doors pivotally mounted on the receptacle, a locking mechanism for the doors comprising a plurality of latch bolts rotatable on a central supporting structure, latches for said doors with which said latch bolts engage, a power mechanism, means to actuate a cam therefrom, and means operatively connected to said cam to control the said latch bolts.

15. In a sterilizer, a toilet bowl having a pivotally mounted seat, a structure forming a housing for the seat in an elevated position, an electric motor having an operating circuit with switches therein, operating mechanisms mounted in the receptacle and actuated by the electric motor, said mechanisms operating the seat to raise and lower same, and means interconnected with said operating mechanism to open one of the switches on the manual manipulation of the seat.

16. In a sterilizer, as claimed in claim 15, doors connected to the said receptacle, an operating mechanism actuated by the motor to open and close said doors, and means interconnected with said mechanism and one of the switches to open said switch on manual manipulation of the doors to break the electric circuit and stop the motor.

17. A sterilizer comprising in combination a toilet bowl having a pivotally mounted seat, a structure forming a receptacle to house the seat in an elevated position, doors connected to the receptacle and forming closures with the seat housed in a sterilizing chamber therein, means to raise and lower the seat, means to electrically heat water to generate steam, means to blow air into said receptacle and exhaust the air therefrom, an electric motor, a circuit for said motor, and means to operate said circuit and the mechanism connected with the motor to operate in sequence the opening of the doors, the lowering of the seat, the stoppage of the motor, the starting of the motor on partial elevation of the seat, the housing of the seat in the receptacle, the closing of the doors, the heating of the water to generate steam, the stoppage of said generation, the forcing of air in the sterilizing chamber and the exhaustion of air and waste steam.

18. The method of sterilizing comprising temporarily enclosing a toilet seat in a sterilizing chamber, injecting a sterilizing fluid in said chamber, retaining the fluid in the chamber a predetermined period and thereafter blowing said sterilizing fluid out of the chamber by air.

19. The method of sterilizing comprising temporarily enclosing a toilet seat in a sterilizing chamber, injecting a hot sterilizing fluid vapor into said chamber and subsequently blowing air into said chamber, the air carrying the waste sterilizing vapor out of the chamber and cooling the seat.

20. The method of sterilizing comprising shifting a toilet seat from a bowl to a sterilizing chamber and enclosing it therein, generating steam, injecting such steam into the sterilizing chamber, cutting off the supply of steam, injecting air into said chamber and exhausting such air with the residual steam, the air cooling the seat, and subsequently removing the seat from the chamber to the bowl.

21. A sterilizer comprising in combination a toilet bowl, a seat therefor, a structure having a sterilizing chamber to house the seat in one position, means to inject steam in said chamber, means to retain the steam in the chamber a predetermined period, and means to force air through the chamber to cool the seat and to exhaust the waste steam.

22. A sterilizer comprising in combination a toilet bowl, a seat therefor, a structure having a sterilizing chamber to house the seat in one position, a seat moving means operable to move the seat in and out of said chamber, a steam generating means controlled by the seat moving means to generate steam and inject steam into said chamber, and means to force air through the chamber to cool the seat and exhaust the waste steam.

23. A sterilizer as claimed in claim 22, there being means to retain the steam in the chamber for a predetermined period.

24. A sterilizer comprising in combination a toilet bowl, a seat therefor, a structure having a sterilizing chamber to house the seat in one position, a seat moving means to move the seat in and out of said chamber, an electrical steam generator controlled by the said moving means to generate steam and inject same into said chamber, and means to force air through the chamber to cool the seat and exhaust the waste steam.

25. The method of sterilizing, comprising temporarily enclosing a toilet seat in a sterilizing chamber, injecting a hot sterilizing fluid into said chamber, retaining said fluid in the chamber for a predetermined period, and subsequently blowing air into said chamber, the air cooling the seat.

26. The method of sterilizing, comprising shifting a toilet seat from a bowl to a sterilizing chamber and enclosing it therein, generating steam, injecting such steam into the sterilizing chamber, retaining the steam in such chamber for a predetermined period, injecting air into the chamber and exhausting such air with the residual steam, the air cooling the seat, and subsequently removing the seat from the chamber to the bowl.

27. The method of sterilizing, comprising temporarily enclosing a toilet seat in a sterilizing chamber while such seat is attached to a toilet bowl, injecting a sterilizing fluid in such chamber, retaining the fluid in the chamber a predetermined period, thereafter blowing such sterilizing fluid out of the chamber by air and discharging the fluid and the air in the bowl.

28. The method of sterilizing, comprising temporarily enclosing a toilet seat in a sterilizing chamber while such seat is attached to a toilet bowl, injecting a hot sterilizing vapor into said chamber, subsequently blowing air into such chamber, and discharging the vapor and the air in the bowl, the air cooling the seat.

29. The method of sterilizing, comprising shifting a toilet seat from a toilet bowl to a sterilizing chamber while the seat is attached to the bowl, enclosing the seat in the chamber, generating a hot sterilizing vapor, injecting such vapor into the sterilizing chamber and retaining such vapor in the chamber for a predetermined period, injecting air into the chamber, exhausting such air with the residual vapor into the bowl, the air cooling the seat and subsequently removing the seat from the chamber to the bowl.

30. A sterilizer comprising in combination a toilet bowl, a seat connected thereto, a structure having a chamber to house said seat, the seat being still connected to the bowl, means to inject a sterilizing fluid into the said chamber, means to retain the fluid in the chamber a predetermined period and means to discharge such fluid into the bowl.

31. A sterilizer comprising in combination a toilet bowl having a seat, a structure having a chamber, means to relatively move the seat and the chamber to enclose the seat, said seat being housed in the chamber in one position, means to inject a sterilizing fluid into such chamber, means to retain the fluid a predetermined period, means to blow air into the chamber and means to exhaust the fluid and air into the bowl.

32. A sterilizer comprising in combination a toilet bowl, a seat therefor, a structure having a sterilizing chamber to house the seat in one position, means to inject steam in said chamber, means to force air through the chamber to cool the seat and to exhaust the waste steam, and means to conduct the waste steam and air to the bowl.

In testimony whereof we have signed our names to this specification.

LEON B. GRAFANI.
ROBERT E. PETERSON.